No. 670,047. Patented Mar. 19, 1901.
G. M. WESTMAN.
PROCESS OF MANUFACTURING LIME AND CARBONIC ACID.
(Application filed June 6, 1900.)
(No Model.) 2 Sheets—Sheet 2.
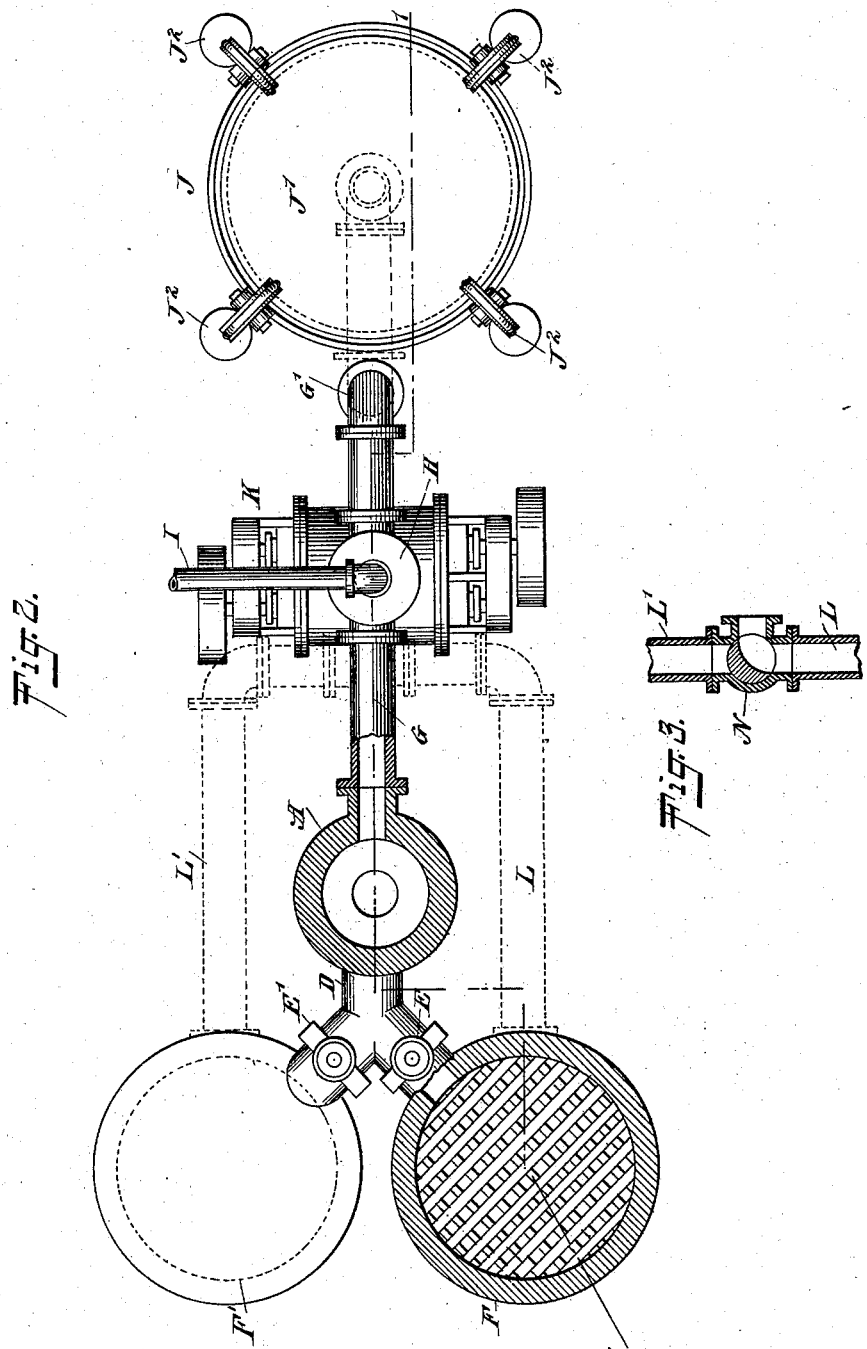
WITNESSES: INVENTOR
Gustaf M. Westman.
BY
ATTORNEYS

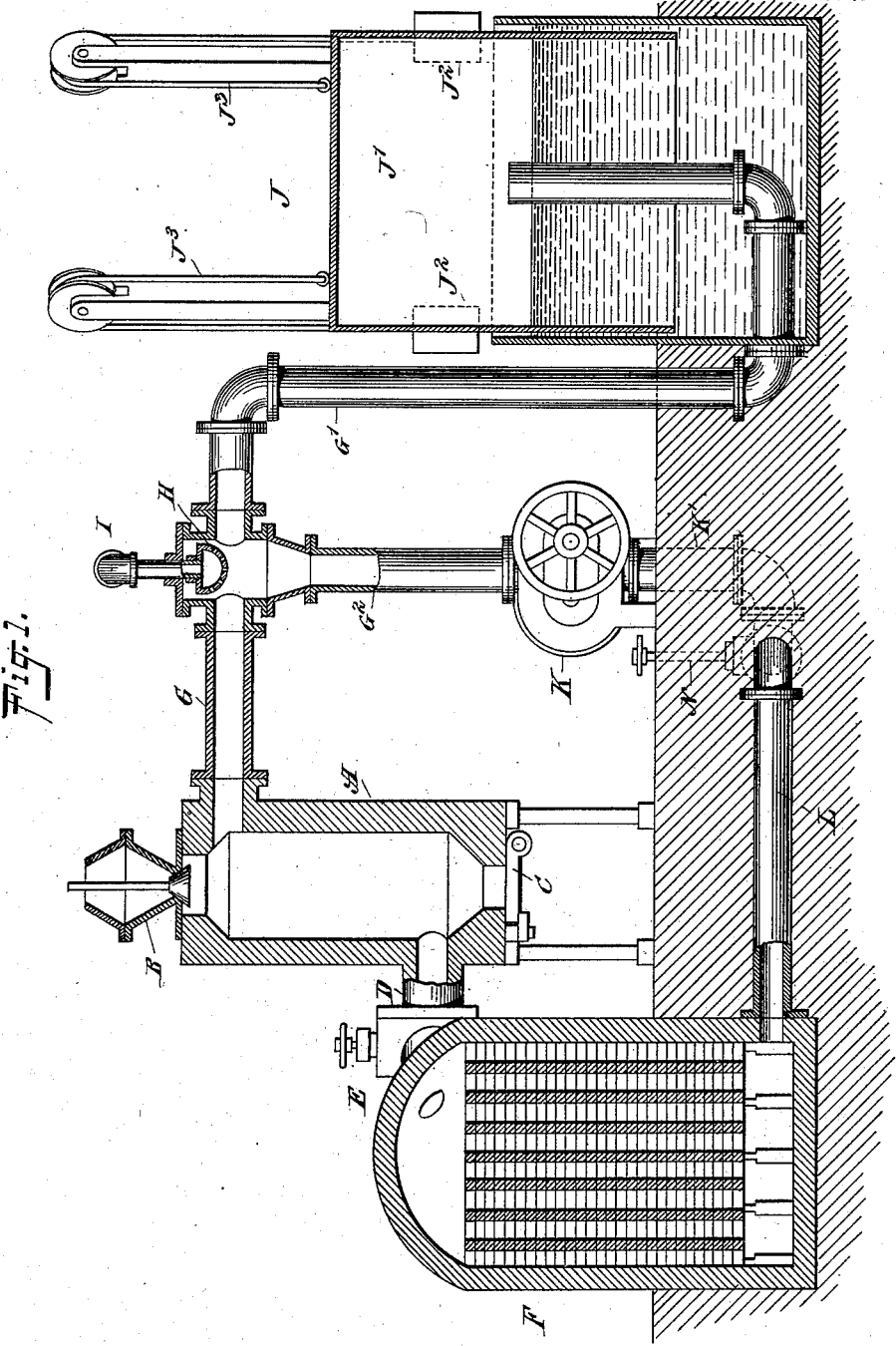

UNITED STATES PATENT OFFICE.

GUSTAF M. WESTMAN, OF NEW YORK, N. Y.

PROCESS OF MANUFACTURING LIME AND CARBONIC ACID.

SPECIFICATION forming part of Letters Patent No. 670,047, dated March 19, 1901.

Original application filed January 6, 1900, Serial No. 615. Divided and this application filed June 6, 1900. Serial No. 19,269.

(No specimens.)

*To all whom it may concern:*

Be it known that I, GUSTAF M. WESTMAN, a subject of the King of Sweden and Norway, and a resident of the city of New York, borough of Manhattan, in the county and State of New York, have invented a new and Improved Process for the Manufacture of Lime and Carbonic Acid, of which the following is a full, clear, and exact description, this being a division of the application for Letters Patent, filed January 6, 1900, Serial No. 615.

The object of the invention is to provide a new and improved process for manufacturing lime and carbonic acid in such a simple and economical manner that both the lime and the carbonic acid are almost immediately in condition for the market.

The process consists, essentially, in passing a mixture of highly-heated carbonic acid and steam into and up through a column of limestone to expel the carbonic acid contained in the limestone and to convert the latter into calcium oxid, then charging the expelled carbonic acid with water to cause the heat of the carbonic acid to convert the water into steam, and thereby reduce its temperature, then conducting a portion of the cooled carbonic acid charged with steam into a regenerator to be highly heated therein and used in turn for expelling carbonic acid from the lime, as above specified, and finally drawing off the calcium oxid from the base of the column.

In order to carry this process into effect, I prefer the apparatus shown and described in the accompanying drawings, forming a part of this specification, in which similar characters of reference indicate corresponding parts in all the views.

Figure 1 is a sectional side elevation of the improvement on the line 1 1 in Fig. 2 and with parts in elevation. Fig. 2 is a plan view of the same with parts in section, and Fig. 3 is a sectional plan view of the three-way valve for passing the carbonic acid from the blower to either of the regenerators.

The apparatus shown in the drawings is provided with a shaft-furnace A, having at its upper end a suitable filling device B for charging the said shaft-furnace with limestone, ($CaCO_3$.) The lower end of the shaft-furnace A is hopper-shaped, and the bottom opening is normally closed by a drop-door C, which can be conveniently opened from time to time to discharge the lime, (CaO.) Into the shaft-furnace A, directly above the hopper-bottom, enters a pipe D, connected by valved branch pipes E E' with regenerators F F', respectively, of any approved construction and adapted to be alternately heated either by burning oil or producer-gases. The regenerators serve to highly heat the mixture of carbonic acid and steam, as hereinafter more fully described and for the purpose stated.

From the upper end of the furnace A, directly below the filling device B, leads a discharge-pipe G for carrying the expelled carbonic acid from the shaft-furnace A, and in the said pipe G is arranged a water-charging device H, preferably in the form of a rose, connected by a pipe I with a suitable water-supply, so that water in spray form passes from the rose into the expelled carbonic acid to be immediately converted into steam and to reduce the temperature of the carbonic acid. A portion of the carbonic acid cooled and charged with steam passes by an extension-pipe G' to the bell J' of a gas-holder J of any approved construction, suitable weights $J^2$ being carried on chains $J^3$, connected with said bell, so as to regulate the pressure in the holder, and consequently regulate the pressure of the gas in the shaft-furnace A.

From the pipe G, directly below the water-charging device H, leads a pipe $G^2$ to a blower K of any approved construction, and the outlet-pipe K' of the blower K is adapted to be connected with either of the pipes L L', leading into the lower ends of the regenerators F F', respectively, a valve N under the control of the operator serving to connect the pipe K' with either of the said pipes L or L'.

The operation is as follows: When the shaft-furnace A is filled with limestone and a mixture of carbonic acid and steam is contained in the holder J and the generator F has been heated and the branch pipe E is opened and the other pipe E' is closed and the valve N, connecting the pipe K' with the pipe L and the blower K, is set in motion, then a mixture of carbonic acid and steam is drawn from the holder J by way of the pipe G' and the pipe G² and forced through the pipes K' and L into the regenerator F, to be heated therein to a high degree, and then passes through the pipes E and D into the lower end of the shaft-furnace A to pass into and up through the column of limestone contained in the said shaft-furnace A. The highly-heated mixture of carbonic acid and steam is the medium for heating the carbonate or limestone contained in the shaft-furnace A and expelling the carbonic acid contained in the limestone and for quickly converting the said limestone into lime, which accumulates on the hopper-bottom of the shaft-furnace and is discharged therefrom from time to time through the door C. The expelled carbonic acid passes from the upper end of the furnace A into the pipe G and to the spraying device H to encounter the water and convert the same into steam, the latter mixing with the carbonic acid to form a mixture of carbonic acid and steam. Part of this mixture may be stored in the holder or receiver J and part is drawn into the blower K to be forced through the pipes K' and L into and through the regenerator F to be heated and again passed through the limestone contained in the furnace A, for the purpose above mentioned. While the regenerator F is in use, the other regenerator F' is heated, as previously explained, and when the mixture of carbonic acid and steam passing through the regenerator F can no longer be heated in the said regenerator to the desired degree then the valve N is shifted to connect the pipe K' with the pipe L' to pass the carbonic acid through the other regenerator F', and thereby insure proper heating of the mixture to the desired degree. The valve in the branch pipe E' is then opened, so as to pass the highly-heated mixture of carbonic acid and steam into and through the limestone in the furnace A for the purpose previously described. While the regenerator F is cut out, as mentioned, it can be reheated in the usual manner to be ready for use as soon as the heat of the regenerator F' has been used up for heating the mixture of carbonic acid and steam.

From the foregoing it is evident that the water is converted into steam at very little expense, as the heat of the expelled carbonic acid is utilized for the purpose, and by the steam mixing with the expelled carbonic acid the tension of the latter is reduced, so that the mixture of carbonic acid and steam after being reheated in the regenerator and passed into the furnace A insures a freer and easier liberation of the carbonic acid contained in the limestone. The mixture of carbonic acid and steam forms the sole medium for conveying the heat into the limestone and for the above-mentioned reason is better than either the carbonic acid or the steam separately.

By cooling the carbonic acid by the steam it is evident that the blower K is not affected by excessive heat, and consequently its proper working is insured at all times. By reducing the tension of the carbonic-acid gas by the steam it is not necessary to reheat the mixture in the regenerator above 1,000° centigrade, and the mixture of this degree of heat is sufficient to properly decompose the limestone in the furnace and to expel the carbonic-acid gas, as previously described. The steam itself does not affect the limestone or the lime at the high temperature mentioned to form hydrate of lime in the furnace.

By increasing or decreasing the weights J² on the holder the pressure in the holder and that in the furnace A may be reduced or increased to prevent too-high or too-low pressure in the furnace.

It is understood that the tension of the carbonic acid is reduced by the steam in proportion to the amount of steam in the carbonic acid, and as the amount of water can be regulated by suitable valves it is evident that the reduction of temperature is under the control of the operator. As the operation continues it is evident that more carbonic acid is produced in the shaft-furnace A than is utilized as a medium for expelling carbonic acid for the continuous process described, and the portion of carbonic acid not so utilized for heating and expelling purposes is readily stored in the holder J with its proportionate amount of steam and can be withdrawn therefrom from time to time into suitable vessels to be ready for the market, it being expressly understood that none of the carbonic acid is lost, and the steam readily condenses in the holder, so as to free the carbonic acid from the steam, and thereby leave the carbonic acid in a pure state.

It is evident from the foregoing that the process is continuous and the gas expelled from the limestone in the shaft-furnace is utilized first for converting water into steam to form a mixture of carbonic acid and steam, the mixture being finally utilized as a heating medium for expelling the carbonic-acid gas from the limestone and at the same time forming the lime.

Highly-heated steam alone may be used; but I prefer the mixture of steam and carbonic acid, as the production of the steam is at a low cost, and the carbonic acid has a higher heat capacity than the steam, and hence the same volume of carbonic acid can carry more heat into the limestone than the steam.

Having thus described my invention, I claim as new and desire to secure by Letters Patent—

The improved continuous process of treating limestone with a highly-heated mixture of carbonic acid and steam as a sole medium of transferring heat, which process consists in expelling the carbonic acid from the limestone, bringing $CO_2$ in contact with water, to convert the latter into steam, and mixing the steam with the expelled carbonic acid, to form a mixture of carbonic acid and steam, and then reheating the mixture and passing it through the limestone, whereby lime and carbonic acid of maximum purity are obtained, the entire amount of carbonic acid evolved and employed being recovered, as specified.

In testimony whereof I have signed my name to this specification in the presence of two subscribing witnesses.

GUSTAF M. WESTMAN.

Witnesses:
 THEO. G. HOSTER,
 JNO. M. RITTER.